United States Patent Office 3,052,383
Patented Sept. 4, 1962

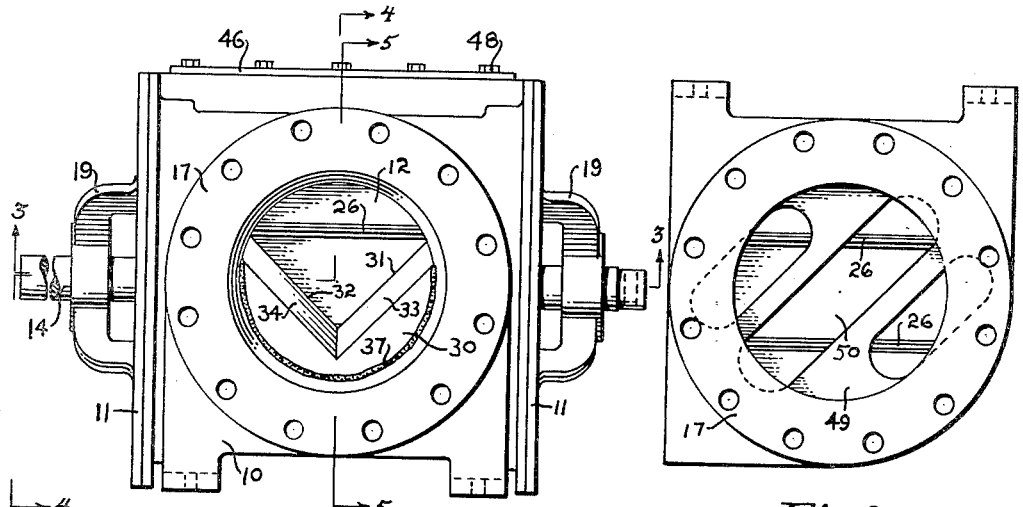
Fig.1.
Fig.2.
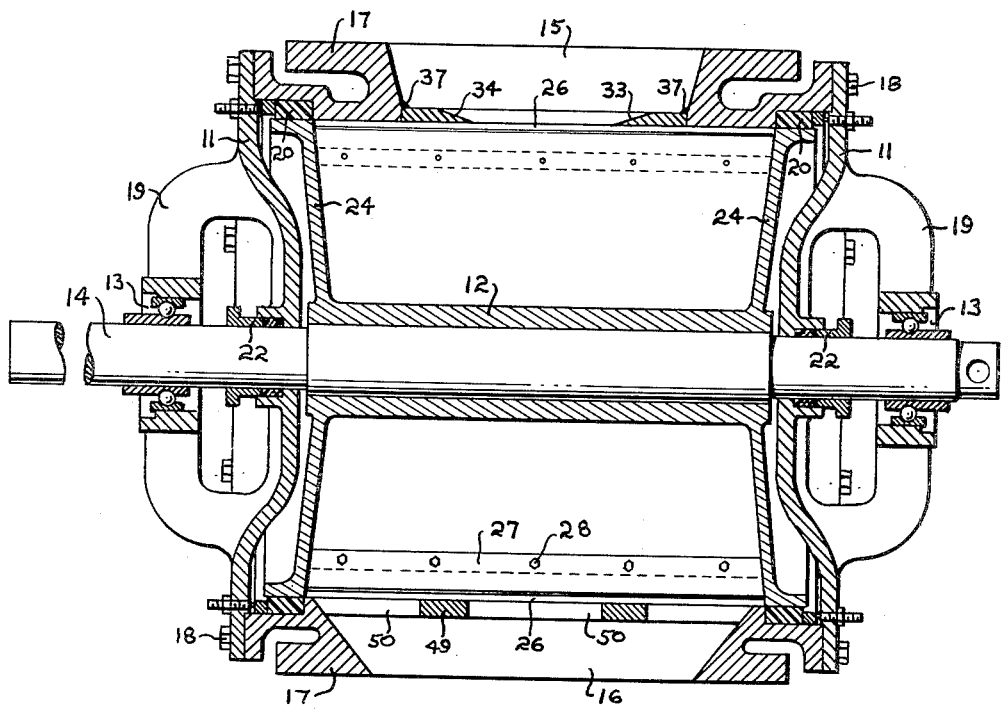
Fig.3.
INVENTOR.
SHERMAN T. TRANSEAU
BY
ATTORNEY.

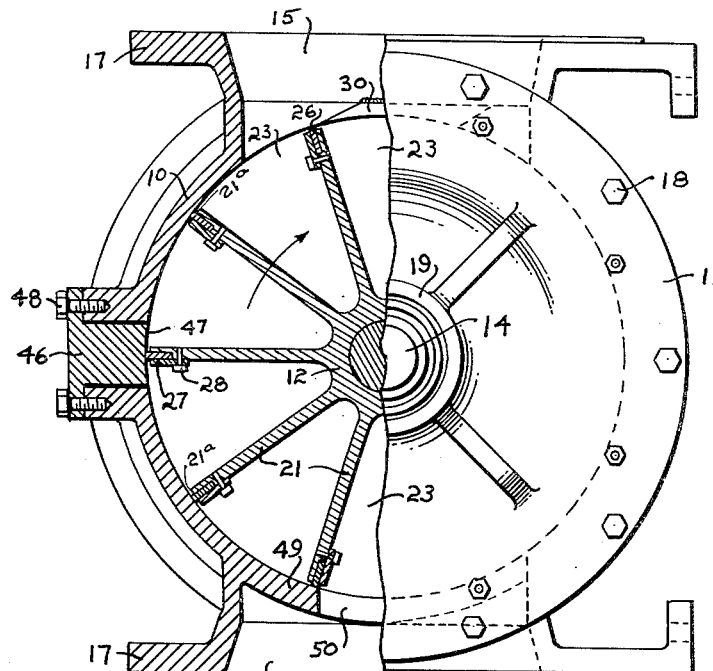
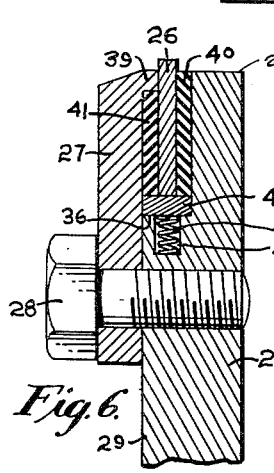
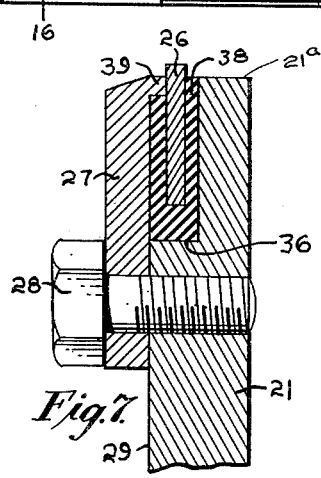
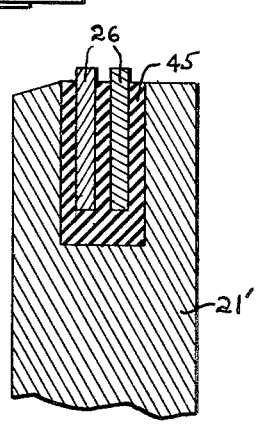
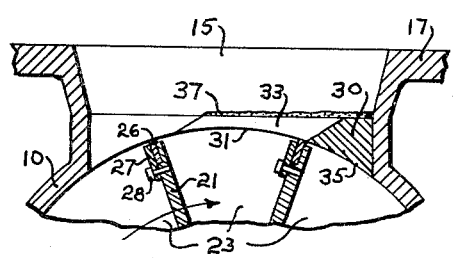
INVENTOR.
SHERMAN T. TRANSEAU
ATTORNEY.

3,052,383
ROTARY FEEDER MECHANISM
Sherman T. Transeau, R.D., Riverside, N.J.
Filed Dec. 28, 1959, Ser. No. 862,230
6 Claims. (Cl. 222—345)

This invention relates generally to rotary feeder mechanisms of the type wherein a circumferentially pocketed rotor part is revolubly journalled in a surrounding housing or stator part having inlet and outlet openings at apposite sides of the rotor which are successively traversed by the several rotor pockets to transfer material delivered into the inlet opening of the feeder to the outlet opening thereof and more particularly to improvements in the construction of such rotor feeder mechanisms for increasing the operating efficiency thereof.

Heretofore and prior to the present invention, it has been a serious problem to insure such adequate sealing between the rotor blades and the inner wall of the stator as is necessary where the feeder mechanism is employed in a system requiring the maintenance of a pressure differential between the inlet and outlet parts of the mechanism, that is, across the rotor part thereof. It has been found that when attempts were made to machine the rotor and stator for close rotating fit of the rotor blades within the stator, even a slight eccentricity of the rotor relative to the stator resulted in serious jamming of the rotor during operation of the feeder mechanism. Moreover, prior experience with the problem has shown that when handling certain kinds of material, such as, for example, pellets of polyethylene or other plastic or gummy materials, jamming of the rotor within the stator occurred even though these parts of the feeder mechanism were perfectly concentric. This jamming of the feeder mechanism by the material being handled resulted from the fact that as the rotor blades successively move across the opening at the bottom of the stator intake throat they necessarily pass through a mass of material which is disposed partially in said throat and partially in the rotor pockets in immediate communication with the throat and in so doing the outer edges of the rotor blades sweep some of such material beyond the inlet opening where it becomes wedged between the rotor blades and the internal wall surface of the stator. This wedging of material between the edges of the rotor blades and the cylindrical wall of the rotor housing (the stator) places a heavy load on the driving mechanism, slowing the rotor and in extreme cases bringing it to a complete halt, attended, of course, by the possibility of mechanical breakdown of the apparatus and other serious consequences due to the strains set up by the jammed rotor.

Having in mind the foregoing, the present invention contemplates elimination of the above-mentioned difficulties by fitting the stator of the feeder mechanism at the bottom of its inlet throat with a shearing element which coacts with the leading edges of the rotor blades to shear through the material which is delivered into and extends as a mass up into the inlet throat from the rotor pockets as they successively traverse the stator inlet opening and thereby reduce to a minimum the possibility of material being wedged between the rotor and stator to an extend sufficient to cause jamming of the apparatus. In order to effect this desired result, it is only necessary that the outer edges of the rotor blades and the internal wall surface of the stator be machined to such relative diameters as to permit free rotation of the rotor within the stator with the leading edges of the rotor slightly spaced from but still in shearing relation to the shear element fitted in the inlet throat of the stator.

Of course, even by so slightly spacing the outer edges of the rotor blade from the cylindrical inside wall surface of the stator, there can be no effective inter-pocket seal between the rotor and stator parts of the feeder mechanism and thus this invention further contemplates that each of the rotor blades may be provided, in certain instances, with radially outwardly biased sealing elements which respectively contact the inner wall surface of the stator during operation of the feeder and so provide an effective seal between the inlet and outlet ports of the feeder mechanism when it is employed in a system which requires the maintenance of a constant pressure differential between the material intake and discharge sides of the rotor.

Additionally provided is an access door in the feeder body by means of which the rotor blades may be conveniently serviced to maintain optimum operating efficiency. Also, the form of the rotor blade sealing assembly makes desirable the incorporation of certain structure into the discharge outlet of the feeder in order that blade wear does not of itself eventually create an undesirable jamming action of the rotor. And finally, the present invention contemplates the provision of a discharge outlet structure which not only serves to insure uniform wear of the rotor blade sealing elements but also provides for discharge of the material in the form of a substantially continuous stream as distinguished from batch discharge of the material. As will be apparent hereinafter, the non-jamming and rotor sealing features of the present invention may be employed equally as well in the feeder mechanism whether it be designed for batch or continuous discharge of the material delivered thereto.

Accordingly, a primary object of the invention is to provide a novel and efficient construction of a rotary feeder mechanism wherein means are provided for prolonging the life of the feeder and for reducing maintenance costs by precluding binding of the rotor within the stator, tending to warp the feeder parts out of proper shape and place undue strain upon the feeder driving mechanism, such binding being normally due to eccentric rotation of the rotor within its stator and to the wedging of the fed material between the contiguous edges of the feeder rotor and stator.

More specifically, it is an object of the present invention to provide the feeder mechanism with coacting shearing elements which act to shear through the mass of material fed into the feeder so as to avoid jamming of the rotor within its housing.

Another object of this invention is to provide a novel rotary feeder mechanism wherein the rotor blades are fitted with radially outwardly biased elements which serve effectively to maintain a substantially gas-tight seal between the outer edges of the rotor blades which form the several pockets of the rotor and the internal wall of the rotor housing.

Still another object of the invention is to provide a novel rotary feeder wherein the rotor blade sealing elements also provide a scraping action for the stator interior surface and thereby prevent the build-up of layered deposits thereon.

Yet another object is to provide a novel rotary feeder mechanism including means for delivering at its outlet a relatively uniform flow of material fed to the inlet instead of discrete batches thereof.

The foregoing and other objects of the invention will become apparent from a reading of the following specification in conjunction with an examination of the appended drawings, wherein:

FIGURE 1 is a plan view of the rotary feeder according to the invention;

FIGURE 2 is a bottom view of the rotary feeder according to the invention and illustrating one form of outlet structure for providing substantially uniform discharge;

FIGURE 3 is an enlarged longitudinal sectional view taken through the rotary feeder illustrated in plan in FIG- URE 1, and is taken along the lines 3—3 as seen in that figure;

FIGURE 4 is an enlarged cross-sectional view through the structure of FIGURE 1 as wound be seen when viewed along the lines 4—4 of that figure, some parts being shown in section and others in elevation;

FIGURE 5 is a fragmentray sectional view as would be seen when viewed along the lines 5—5 of FIGURE 1 and illustrates the V-shaped shear secured within the inlet throat of the feeder unit and its relation to the rotor blade;

FIGURES 6, 7 and 8 are enlarged fragmentary views of the rotor pocket edges illustrating the rotor blade sealing elements and their manner of alternative securement to the pocket edges.

In these several figures like elements are denoted by like reference characters.

Referring now to the drawings, and firstly, to FIGURES 1, 3 and 4, there will be seen a rotary feeder mechanism comprising generally a hollow cylindrical body member or main housing 10, a pair of end closure members 11, a rotor 12 fitted within the housing 10 between the end members 11, and a shaft 14 which passes axially through the rotor 12 and by means of which the latter is rotated. Extending upwardly and downwardly respectively from hollow cylindrical portion of the main housing 10 are an inlet throat 15 and a discharge outlet 16 each of which terminates in an annular bolting flange 17 by means of which the rotary feeder mechanism may be coupled into a bulk material conveying conduit (not shown).

As best seen in FIGURES 3 and 4 respectively, the end members 11 are bolted to the main housing 10 as by means of the bolts 18, and a pair of annular sealing ring assemblies 20 are disposed circumferentially about opposite ends of the rotor 12 to provide a seal between the rotor surface and the main housing 10 effective to prevent the conduited material passing through the feeder from being excreted laterally outwardly over the surface of the rotor 12 toward the end members 11. The shaft 14, to which is secured the rotor 12, is surrounded where it passes through the end members 11 by the gland assemblies 22 and is journalled at opposite ends in bearings 13 supported by portions 19 of the end members 11.

The rotor 12 is formed by the opposite side or end walls 24 and the radially projecting blade-like partitions 21 into a plurality of pockets 23 spaced uniformly about the rotor periphery, each of the pockets 23 being generally of V-shape in cross section with its open end presenting outwardly of the rotor axis. The width of each of the pockets 23, which corresponds to the distance between the opposite side walls 24 of the rotor, is seen to be somewhat greater than the diameters of the axially alined inlet throat 15 and the discharge outlet 16, so that the ends of the rotor partitions 21 always lie beyond the edges of the inlet and outlet. The foregoing described aspects of the rotary feeder mechanism have been set forth generally to establish the basic configuration of the rotary feeder, the actual invention residing in particular structural aspects to be now described.

As previously pointed out, when conduit material, as for example polyethylene pellets, are passed through the rotary feeder some of these pellets will take up physical positions wherein they lie partly within a rotor pocket 23 and partly within the inlet throat 15, thereby creating the possibility of jamming the feeder mechanism by becoming wedged between the contiguous edges of the rotor partitions 21 and the inside cylindrical surface of the main housing 10. This problem is overcome by providing a shearing element 30 placed in the inlet throat in shearing relation to the leading edges 21a of the rotor partitions 21. The organization of the shear element 30 and the rotor blades 21 is illustrated in the showings of FIGURES 1, 3, 4 and 5. As best seen in the showing of FIGURE 1, the shear element 30 is formed with a pair of active cutting edges 31 and 32 disposed in a V formation and so oriented relatively to the top edge of the rotor blade 21 that the latter forms the base of an isosceles triangle with the active edges 31 and 32 of the shearing element, the latter forming the sides of the triangle. The shearing edges 31 and 32 are suitably formed, as, for example, by grinding the body of the shear element 30, to provide the chamfered faces 33 and 34 extending between the top and bottom surface of the shearing element.

When the rotor 12 turns, the leading edges 21a of each rotor blade 21 successively sweep across the active edges 31 and 32 of the shear element 30 at the open end of the V in shearing relation thereto. As the blade 21 moves toward the vertex of the V the points of shear between the active edges 31 and 32 of the shear element 30 and the rotor blade edge 21a move inward, merging at the vertex at which point the entire blade 21 has passed under and across the inlet and into the main housing interior. Of course, any of the conduited material which was disposed between the cutting edges 31 and 32 of the shear and the top of the rotor blades 21 is readily cut through as the leading edge 21a of each rotor blade, traverses the shear element 30 during rotation of the rotor. As best seen in the showings of FIGURES 4 and 5, the undersurface 35 of the shear element 30 is contoured to lie exactly in the curved plane of the cylindrical inner surface of the main housing 10 so that it acts as an extension thereof and presents no discontinuities to the rotor blades and their respective sealing elements. The shearing element 30 may be secured within the inlet throat in any convenient manner, as, for example, by welding, as shown in the figures at 37.

The rotor sealing elements, illustrated generally in the showings of FIGURES 3, 4 and 5, each basically comprise a substantially flat elongated member 26 secured to the outer edge of the rotor blade 21 by means of a clamping plate 27 and bolt 28, as best shown in detail in the alternative showings of FIGURES 6, 7 and 8. Examining first FIGURE 7, it is to be observed that the trailing face 29 of the rotor blade 21 is rabbetted or recessed downward and inward from its upper edge to provide an inwardly offset shoulder or ledge 36 extending along the full width of the blade 21. The clamping plate 27 which is bolted to the rotor blade trailing face 29 by means of the bolts 28 forms with the recessed portion of the blade 21 a slot or groove within which is disposed the sealing member 26 cushioned in a piece of U-shaped resilient material 38, such as rubber or neoprene or the like. The resilient nature of the material 38, a portion of which is disposed between the bottom edge of the member 26 and the ledge 36 of the blade 21, imparts an outward bias to the member 26 so as to maintain it in contact with the inside surface of the stator 10 which houses the rotor 12, and hence, of course, also with the cutting edges 31 and 32 of the shear element 30 when the blade passes under the inlet 15. The side portions of the resilient material 38 disposed between the member 26 and its associated rotor blade 21 on the one side and the member 26 and its associated clamping plate 27 on the other, are compressed when the clamping plate 27 is drawn up rightly by the bolts 28 so as to firmly cushion the member 26 between its supporting blade and clamping plate. Additionally, the top edge of the clamping plate 27 is turned forwardly as at 39 into engagement with the rear surface of the member 26 and acts as a rigid backing for the latter which prevents any tendency toward chattering of the blade.

Turning now to an examination of FIGURE 6, it will be observed that this construction is similar to that of FIGURE 7 already described except that in place of the generally U-shaped piece of resilient material 38 seen in FIGURE 7, there are employed a pair of flat resilient strips 40 and 41 disposed upon opposite faces of the sealing member 26 and a non-resilient bottom strip 42 biased upwardly against the lower edge of the member 26 by a plurality of longitudinally spaced springs 43 seated in a groove 44 recessed downwardly from the ledge 36 in the rotor blade 21. The use of the non-resilient biasing strip 42 and the associated springs 43 affords a somewhat more closely controlled outward bias for the member 26, and in some instances may be more desirable than the construction as shown in FIGURE 7.

FIGURE 8 illustrates yet a third alternative of rotor tip construction which does not utilize the clamping plate 27 and bolts 28, but which instead employs a pair of longitudinally extending sealing members 26 seated in spaced, parallel relation within a recess in the edge of the rotor blade 21', these members being separated from each other and from the walls of the recess by the resilient material 45 illustrated as being generally in the shape of the letter W.

In all of the FIGURES 6, 7 and 8, it will be observed that the rotor sealing members 26 project outwardly beyond the edges of the rotor blades with which they are respectively associated so that only the sealing members 26 effectively contact the inside cylindrical surface of the main housing 10, including the inner complementally shaped surfaces of the shear element 30. The outward bias applied to these sealing members 26 by the resilient materials 38 and 45 of FIGURES 7 and 8 or by the spring biasing arrangement of FIGURE 6 provide an effective substantially gas-tight seal between the pocketed rotor and its embracing stator and thereby enables the feeder mechanism equipped with such sealing members to be employed in systems wherein it is necessary to maintain a pressure differential across the rotor, i.e., between the material intake and discharge ends of the feeder mechanism.

At the same time the leading edges 21a of the rotor blades 21 are so closely, yet freely, related to the inner cylindrical surfaces of the stator 10 and the shear element 30 fitted in the stator intake throat as to shearingly coact with the shear element 30 to shear through any material disposed in the path of travel of the rotor blade leading edges 21a and in conjunction with the rotor sealing elements 26 maintain the feeder free from any build-up of any material conveyed therethrough which of itself in time might tend to produce a restrictive effect upon the free rotation of the rotor within the housing.

For purposes of maintenance, and as best seen in the showing of FIGURE 4, an access door 46 is provided through the side wall of the main housing 10 so that the rotor sealing members 26 may be periodically checked and replaced as necessary. The inside surface 47 of the access door 46 is contoured to provide a smooth continuation of the inside cylindrical surface of the main housing 10 and avoid chatter and possible jamming of the outwardly biased members 26 as they rotate pass this region of the housing. The access door 46 extends substantially the full width of the housing 10, as is best seen in the showing of FIGURE 1, and is secured thereto by a plurality of bolts 48.

Turning now finally to the showings of FIGURE 2 and 3, it seen that the discharge outlet 16 includes a transversely extending apertured closure formation 49 having longitudinal slots 50 cut therethrough and oriented diagonally thereacross. The outer edges of the rotor sealing members 26 wipe across the closure formation 49 as they rotate pass the discharge outlet 16, different portions of a given pocket 23 being exposed through the slots 50 as the rotor rotates. Thus, as the rotor pocket 23 approaches the discharge outlet 16, the entire contents thereof are not discharged in a batch but instead begin to discharge from the pocket ends in the region of the rotor end closures 24, the discharge area moving in toward the pocket center as the rotor continues to turn to thus provide a more continuous flow of material out of the rotor pocket. From FIGURE 2 it will be observed that a second pocket begins to discharge while the immediately preceeding pocket is still above the discharge outlet 16 because, as shown, the front to back dimension of each pocket is substantially less than the opening of the discharge outlet 16.

FIGURE 4 most clearly illustrates that the aperture closure formation 49 above the discharge outlet is also contoured to conform to the inside cylindrical surface of the main housing 10 for the same reasons as already set forth for the undersurface 35 of the shear element 30 and the inner surface 47 of the access door 46. If instead of a continuous feed type of discharge, it is desired to provide a batch type of discharge, then it is necessary merely to enlarge the longitudinal slots 50 by removing more of the solid portion of the closure formation 49. When so doing, however, care should be exercised to insure that the portion remaining of the closure formation 49 extends diagonally across the discharge outlet so that the rotor sealing members 26 are wiped transversely as they pass by. This arrangement prevents grooving of the rotor blades which might otherwise occur if contact were always made at the same point throughout the rotor revolution.

Having now described my invention in connection with a particularly illustrated embodiment thereof, and understanding that variations and modifications will occur from time to time to those persons normally skilled in the art without departing from the essential scope or spirit of the invention, it is intended to claim the same broadly as well as specifically as indicated by the appended claims.

What is claimed as new and useful is:

1. A rotary feeder mechanism for conduited bulk material comprising a main housing having a cylindrical passage therethrough, the cylindrical axis of which extends transversely to the flow of material, an inlet throat and a discharge outlet each communicating with the cylindrical passage of the main housing, a rotor disposed within said cylindrical passage and adapted to rotate therein, said rotor including a plurality of pockets spaced peripherally thereabout which rotate successively past the inlet throat and discharge outlet as said rotor rotates, each of said pockets being defined by a pair of angularly-spaced radially-extending rotor blades, and shear means within said inlet throat cooperating with the outer free edges of said rotor blades upon rotation of the rotor for shearing off conduited material disposed partly within the inlet throat and partly within a rotor pocket, whereby the conduited material is prevented from jamming the rotary feeder mechanism, said shear means comprising a shear plate having cutting edges disposed in a V-formation and oriented within the inlet throat so that opposite edges of the V at the open end thereof coact with the rotor blades as the latter successively move across the inlet throat, the leading edge of each rotor blade being in constant shearing relation to the shear plate as said blade moves along said shear plate progressively from the divergent ends to the vertex of the V-shaped cutting edges thereof, said shear plate being contoured to conform to the cylindrical surface of the passage in the main housing and act as an extension thereof partially into the inlet throat.

2. A rotary feeder mechanism for conduited bulk material comprising a main housing having a cylindrical passage therethrough, the cylindrical axis of which extends transversely to the flow of material, an inlet throat and a discharge outlet each communicating with the cylindrical passage of the main housing, a rotor disposed within said cylindrical passage and adapted to rotate therein, said rotor including a plurality of pockets spaced peripherally thereabout which rotate successively past the inlet throat and discharge outlet as said rotor rotates, each of said pockets being defined by a pair of angularly-spaced radially-extending rotor blades, each of said rotor blades having a blade-like sealing element secured to its outermost edge for effectively sealing off said inlet throat from said discharge outlet of the feeder mechanism for use thereof in systems requiring the maintenance of a pressure differential across the rotor, said blade-like sealing elements being each seated within a rotor blade recess extending radially inward from the rotor blade outermost edge, the outer edge of said sealing element extending radially outward beyond the rotor blade edge and being biased radially outward into engagement with the cylindrical surface of the main housing passage by means disposed within said recess between the recess bottom and the inner edge of the blade-like sealing element, said discharge outlet being provided with a member extending diametrically across the opening thereof and at an angle to the axis of rotation of the rotor to provide wiping contact with the outer edges of said blade-like sealing elements across the portions thereof extending chordally across the discharge outlet, the inner contacting surface of said member being contoured to a cylindrical curvature coinciding with that of the wall of said cylindrical passage whereby the outer edge of each of said blade-like sealing elements is subject to uniform wear across the full extent thereof.

3. A rotary feeder mechanism for conduited bulk material comprising a main housing having a cylindrical passage therethrough, the cylindrical axis of which extends transversely to the flow of material, an inlet throat and a discharge outlet each communicating with the cylindrical passage of the main housing, a rotor disposed within said cylindrical passage and adapted to rotate therein, said rotor including a plurality of pockets spaced peripherally thereabout which rotate successively past the inlet throat and discharge outlet as said rotor rotates, each of said pockets being defined by a pair of angularly-spaced radially-extending rotor blades, each of said rotor blades having a blade-like sealing element secured to its outermost edge for effectively sealing off said inlet throat from said discharge outlet of the feeder mechanism for use thereof in systems requiring the maintenance of a pressure differential across the rotor, said blade-like sealing elements being each seated within a rotor blade recess extending radially inward from the rotor blade outermost edge, the outer edge of said sealing element extending radially outward beyond the rotor blade edge and being biased radially outward into engagement with the cylindrical surface of the main housing passage by means disposed within said recess between the recess bottom and the inner edge of the blade-like sealing element, each of said sealing elements being secured to its associated rotor blade by means of a rigid clamping plate forming one wall of the recess within which each sealing element is seated, the front and rear surfaces of each sealing element being cushioned against direct contact with the recess walls by intervening layers of resilient material, and said clamping plate being provided at its outermost edge with a forwardly turned projection which contactingly engages the rear surface of the blade-like sealing element to thereby act as a rigid backing member therefor.

4. A rotary feeder mechanism for conduited bulk material comprising a main housing having a cylindrical passage therethrough, the cylindrical axis of which extends transversely to the flow of material, an inlet throat and a discharge outlet each communicating with the cylindrical passage of the main housing, a rotor disposed within said cylindrical passage and adapted to rotate therein, said rotor including a plurality of pockets spaced peripherally thereabout which rotate successively past the inlet throat and discharge outlet as said rotor rotates, each of said pockets being defined by a pair of angularly-spaced radially-extending rotor blades, each of said rotor blades having a blade-like sealing element secured to its outermost edge for effectively sealing off said inlet throat from said discharge outlet of the feeder mechanism for use thereof in systems requiring the maintenance of a pressure differential across the rotor, said blade-like sealing elements being each seated within a rotor blade recess extending radially inward from the rotor blade outermost edge, the outer edge of said sealing element extending radially outward beyond the rotor blade edge and being biased radially outward into engagement with the cylindrical surface of the main housing passage by means disposed within said recess between the recess bottom and the inner edge of the blade-like sealing element, and a service door fitted into an opening through the housing side, which opening communicates with the cylindrical rotor passage and by means of which the blade-like sealing elements may be replaced when the service door is removed therefrom, said service door being removably fitted closely within said housing opening, extending inwardly to said cylindrical passage and having an inside surface contoured to conform exactly to the cylindrical wall curvature thereof to thereby maintain unbroken the surface continuity of the rotor passage.

5. A rotary feeder mechanism for conduited bulk material comprising a main housing having a cylindrical passage therethrough, the cylindrical axis of which extends transversely to the flow of material, an inlet throat and a discharge outlet each communicating with the cylindrical passage of the main housing, a rotor concentrically disposed within said cylindrical passage for rotation therewithin about the axis thereof, said rotor including a plurality of circumferentially spaced pockets having open ends presenting radially outward of the rotor axis and adapted for successive registry with said inlet throat and discharge outlet as the rotor rotates, and an apertured material discharge plate disposed in the flow path of material discharged from the discharge outlet, said discharge plate having longitudinal slots therein oriented at an angle to the axis of rotation of the rotor, whereby each rotor pocket while in communication with the discharge outlet discharges material therefrom continuously through said slots from different regions of said pocket progressively brought into registry with different regions of said slots as said pocket traverses the discharge outlet upon rotation of the rotor.

6. A rotary feeder mechanism for conduited bulk material comprising a main housing having a cylindrical passage therethrough, the cylindrical axis of which extends transversely to the flow of material, an inlet throat and a discharge outlet each communicating with the cylindrical passage of the main housing, a rotor disposed within said cylindrical passage and adapted to rotate therein, said rotor including a plurality of pockets spaced peripherally thereabout which rotate successively past the inlet throat and discharge outlet as said rotor rotates, each of said pockets being defined by a pair of angularly-spaced radially-extending rotor blades, and shear means within said inlet throat co-operating with the outer free edges of said rotor blades upon rotation of the rotor for shearing off conduited material disposed partly within the inlet throat and partly within a rotor pocket, whereby the conduited material is prevented from jamming the rotary feeder mechanism, said shear means comprising a shear plate having a cutting edge disposed within the inlet throat and oriented transversely to the longitudinally extending outer edges of the rotor blades for shearing co-action with the leading edges of the rotor blades as the latter successively move across the inlet throat, the shearing contact between the cutting edge of said shear plate and the leading edge of each rotor blade continuously shifting as the blade rotates through said inlet throat, said shear plate being contoured to conform to the cylindrical surface of the passage in the main housing and act as an extension thereof partially into the inlet throat.

References Cited in the file of this patent

UNITED STATES PATENTS

| | | |
|---|---|---|
| 1,143,634 | Lane et al. | June 22, 1915 |
| 1,215,531 | Hill et al. | Feb. 13, 1917 |
| 2,367,311 | Reece | Jan. 16, 1945 |
| 2,858,212 | Durant et al. | Oct. 28, 1958 |
| 2,888,175 | Harrison et al. | May 26, 1959 |
| 2,907,499 | Agronin | Oct. 6, 1959 |